UNITED STATES PATENT OFFICE.

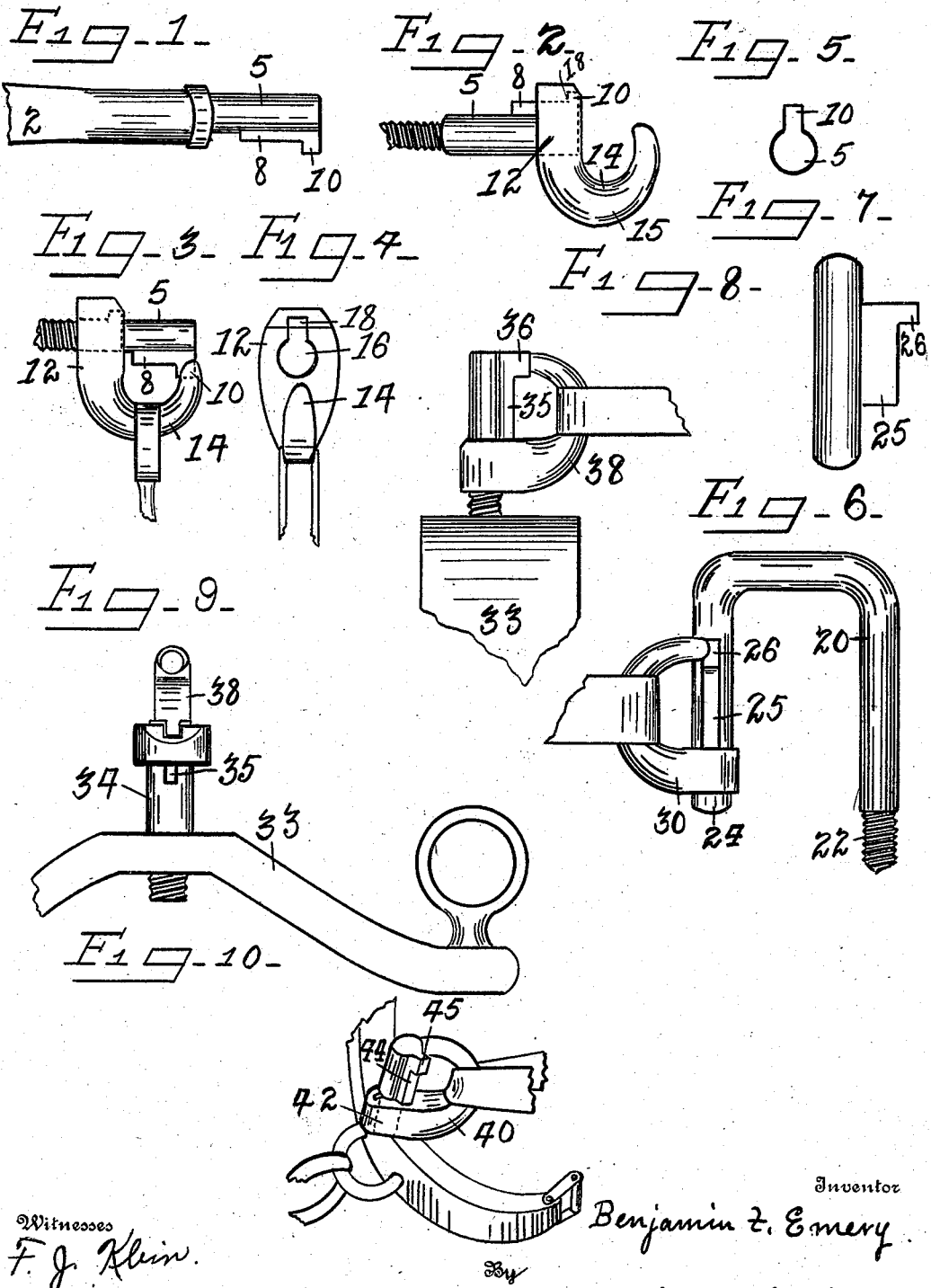

BENJAMIN F. EMERY, OF THAYER, IOWA.

LOCKING-HOOK.

No. 881,229.      Specification of Letters Patent.      Patented March 10, 1908.

Application filed April 29, 1907. Serial No. 370,820.

*To all whom it may concern:*

Be it known that I, BENJAMIN F. EMERY, citizen of the United States, residing at Thayer, in the county of Union and State of Iowa, have invented certain new and useful Improvements in Locking-Hooks, of which the following is a specification.

My invention has relation to devices for locking hooks, and has for its object to provide a hook which can be adapted for use in various connections and especially with different parts of harnesses and wagons, such as breeching straps or hold-backs, hame-straps, check-reins, neckyokes, swingletrees and numerous other places, where there is a necessity for a quickly adjusted hook and a hook adapted to self-lock against any accidental displacement.

It consists in a hook proper provided with a recess extending through the body of the hook and a stem adapted to be secured in the part of the harness with which it is used, and provided with a shoulder or bit on the stem adapted to engage the recess in the hook and permit the hook to rotate on part of the stem outside of the shoulder and to slide upon the shoulder, and also in means for limiting both the sliding and rotary movement of the hook on the stem.

Figure 1 is a perspective view of the stem or lock attached to a whiffle-tree with the hook removed. Fig. 2 is a perspective view showing the device when it is open or unlocked. Fig. 3 shows the device locked on the stem and a trace or tug locked in engagement therewith. Fig. 4 is an end view of the hook disengaged from the stem and showing the recess therein. Fig. 5 is an end view of the stem or lock. Fig. 6 is a side elevation of the device as applied to the shafts of a wagon with the hold-backs or breeching straps. Fig. 7 is an end view of Fig. 6 with the hook removed and showing the shoulder and lug for locking the hook. Fig. 8 is a side elevation of the back-pad with the device used to hold a check-rein. Fig. 9 is an end view of Fig. 8. Fig. 10 is a perspective view of the device attached to one of the hames of the harness for locking the breast straps to the ends of the neck-yoke.

Referring to the drawings 2 designates one end of a whiffle-tree. Into the end of the whiffle-tree is secured the stem or lock 5. The stem 5 is preferably round with a shoulder 8 along its outer end terminating in a lug 10, as shown in Fig. 5. The hook 15 consists of a shank 12 with curved part 14 and is provided with a recess 16 therethrough, as shown in Fig. 4 and is of the shape and size of the stem including the shoulder. The recess 16 is lengthened out at the end forming a shoulder 18 of the length and size of the lug 10 and prevents the hook from becoming disengaged from the stem and limits the outward movement of the hook on the stem.

In Figs. 6 and 7 is shown the lock-hook as adapted to be applied to the shafts of a wagon, to which the breeching-straps or hold-back straps may be attached. This consists of the stem 20 provided with the screw 22 by which it is secured to the top of the shafts. This stem is preferably bent into rectangular shape with the outer arm projecting vertically to the shaft into which it is secured. On this lower portion is secured the shoulder or lock 25 provided with the lug 26. The hook 30 to be used with this stem is practically the same as that used with whiffle-tree, though for greater convenience it is somewhat of rectangular shape having the shank 30 of circular form and provided with substantially the same shaped recess as 16 and 18, in Fig. 4.

In Figs. 8 and 9 the lock hook is shown attached to a back pad 33 of a harness, and consists of the stem 34 provided with the shoulder 35 and lug 36 together with the hook 38 adapted to rotate on the lower part of the stem and slide along over the shoulder on the upper part, the same as in Fig. 1.

In Fig. 10 the same lock-hook 40 is shown as attached to the hames of a harness into which the breast-strap that is connected with the neck-yoke may be secured. This hook 40 is secured by its stem 42 into one side of the hame and is provided with the shoulder 44 and lug 45 also the same as shown in Fig. 1.

The mode of operating my device in the various connections for which it is adapted is substantially as follows: Where it is used in connection with a swingle-tree the hook 15 is mounted upon the stem 5 and the stem is then screwed or fastened in the end of the whiffle-tree leaving a short space between the end of the whiffle-tree and the shoulder 8. On this round space the hook 15 is adapted to rotate. When the trace is to be secured on the hook 15 the hook is slid on the stem 5 and the shoulder 8 until lug 10 comes in contact with the ledge or shoulder 18 which limits its outward movement. It will then be in the position shown in Fig. 2, whereby the traces or tug may be readily attached upon the end 14 of the hook. When the trace is attached then the hook is slid inward on the stem beyond the shoulder to the round surface of the stem and the hook is rotated around until the point 14 comes into engagement with the lug 10. Then the lug 10 is on a horizontal plane parallel with the doubletree or the brace between the shafts. In this position with the point 14 of the hook resting upon the lug 10 the hook 15 and the trace cannot drop down and come into contact with the doubletree or with the crossbar of the shafts. This is of great advantage as the holding up of the trace and swingletree prevents the wear on the doubletree or crossbar and keeps the hook from contacting with the doubletree or cross-bar.

The manner of using the device as shown in Figs. 6 and 7 whereby the hold-backs are connected thereto, is by first inserting the end 24 in the recess in the shank of the hook 30 and sliding the hook upon the shoulder, then securing the end 22 through the shaft with the end 24 a short distance above the shaft, then sliding the hook along on the shoulder until its upward movement is limited by the lug 26 when the hold-back strap 31 may be caught over the end of the hook 30, and then sliding the hook along down the shoulder till the shank is below the shoulder 25 where it may be rotated. The hook may now be turned on the part 24, till the point comes in contact with the lug 26 and locks or limits the rotation of the hook on the part 24.

If it is to be used as a check-rein holder as shown in Figs. 8 and 9, the stem 34 is fastened through the back pad 33. The hook is then raised up till the lug 36 engages with the shoulder 18 in the recess 16 when the check-rein may be brought into engagement with the hook which is then lowered to the position shown in Fig. 8 and turned till the hook 38 comes in engagement with the lug 36.

The device operates the same in Fig. 10 as in Fig. 8: the breast strap from the neck-yoke is brought into engagement with the hook 40 when the lug 45 is in engagement with the shoulder 18, then the hook is lowered and turned till the point of the hook engages the lug 45 and locks or limits its further rotation.

It will be seen that in each of the different positions the hook is locked when the point is turned and brought into engagement with the lug on the stem which limits its further rotation and the hook cannot be removed from the stem because the lug 10 engages the shoulder 18 and limits the sliding movement of the hook on the stem.

Having now described my invention what I claim is:

1. In a device of the character described, a stem, a shoulder on the stem, a hook provided with a recess and adapted to slide on the stem with the stem in the recess, and a lug connected with the shoulder on the stem for limiting the outward movement of the hook.

2. In a device of the character described, a hook provided with a recess through the shank, a stem provided with a shoulder, said stem adapted to engage in the recess in the hook and permit the hook to slide thereon, and a lug on the outer end of the shoulder on the stem engaging the hook for limiting the movement of the hook upon the stem.

3. In a device of the character described, a hook provided with a recess therethrough and a shoulder in one end of the recess, a stem provided with a shoulder adapted to engage the recess in the hook and permit the hook to slide thereon, and a lug on the stem adapted to engage the shoulder in the recess in the hook and limit the outward movement of the hook.

4. In a device of the character described, a stem adapted to be inserted in the article to which it is applied, a shoulder on the outer end of the stem, a lug on the outer end of the shoulder on the stem, and a hook provided with a recess of unequal dimensions and adapted to be engaged by the stem and rotate therein and slide on the shoulder and be limited in its sliding movement by the lug on the stem.

5. In a device of the character described, a stem provided with a shoulder on its outer end and a lug on the outer part of the shoulder, and a hook provided with a recess therethrough and a shoulder, in said recess, said hook adapted to rotate on the stem and its rotation limited by the engagement of the hook with the lug on the shoulder and also adapted to slide on the stem and the sliding movement limited by the engagement of the lug on the stem with the shoulder in the recess in the hook.

In testimony whereof I affix my signature in presence of two witnesses.

BENJAMIN F. EMERY.

Witnesses:
 M. M. CADY,
 F. J. KLEIN.